United States Patent
Takano et al.

[11] Patent Number: 6,114,648
[45] Date of Patent: Sep. 5, 2000

[54] WASTE DEMOLISHING METHOD AND APPARATUS THEREFOR

[75] Inventors: Hiroshi Takano, Kouka-gun; Tetsushi Yonekawa, Otsu, both of Japan

[73] Assignee: Matsushita Electric Industrial Co., Ltd., Kadoma, Japan

[21] Appl. No.: 09/311,280

[22] Filed: May 14, 1999

[30] Foreign Application Priority Data

Sep. 30, 1998 [JP] Japan .................................. 10-277563

[51] Int. Cl.[7] .................................................. B23K 9/00
[52] U.S. Cl. ................................ 219/121.37; 219/121.43
[58] Field of Search ........................ 219/121.37, 121.43, 219/121.44, 121.39, 121.59; 373/8, 18, 20, 25; 558/900, 240; 110/346, 235, 246

[56] References Cited

U.S. PATENT DOCUMENTS

| | | | |
|---|---|---|---|
| 4,419,943 | 12/1983 | Faurholdt | 110/237 |
| 4,835,359 | 5/1989 | Sciortino | 219/121.59 |
| 4,918,282 | 4/1990 | Cheek | 219/121.37 |
| 4,940,519 | 7/1990 | Dames | 558/240 |
| 5,138,959 | 8/1992 | Kulkarni | 110/346 |
| 5,532,448 | 7/1996 | Schlienger | 219/121.43 |
| 5,762,009 | 6/1998 | Garrison et al. | 110/346 |

*Primary Examiner*—Teresa Walberg
*Assistant Examiner*—Quang Van
*Attorney, Agent, or Firm*—Wenderoth, Lind & Ponack, L.L.P.

[57] ABSTRACT

An apparatus for demolishing an oil-containing industrial waste object, includes a turntable for supporting thereon of an oil-containing industrial waste object, a sealed enclosure mounted above the turntable for gas-tightly enclosing the industrial waste object, a fluid pumping device for sucking a fluid medium out from the sealed enclosure, and a plasma arc torch fitted inside the sealed enclosure for radiating the industrial waste object with a plasma. After the fluid medium within the sealed enclosure has been sucked out by the fluid pumping device, an inert gas is supplied into the sealed enclosure through an inert gas supply port. The industrial waste object is then irradiated by a plasma from the plasma arc torch while being rotated together with the turntable, to thereby cut the industrial waste object horizontally.

5 Claims, 1 Drawing Sheet

WASTE DEMOLISHING METHOD AND APPARATUS THEREFOR

BACKGROUND OF THE INVENTION

1. Field of the Invention

The present invention relates to a method of and apparatus for demolishing an oil-containing industrial waste object such as, for example, a compressor or an automotive engine.

2. Description of the Related Art

Conventionally, after an industrial waste object made from iron, plastic or a combination of these, etc. has been broken up using a breaking machine, or the like, it is recycled by separation and classification.

Since waste objects such as compressors, engines, or the like contain oil, there is a danger of the oil catching fire and exploding if they are put directly into a breaking machine in this state. Thus, it has only been possible to break up such products by low-temperature breaking in an inert gas atmosphere, which entails expensive apparatus and running costs. In general, it has been common to use manual dismantling by fusing, which is inexpensive but dangerous.

However, the manual dismantling by fusing generates flames and involves the danger of fire or burns. In particular, where dismantling is carried out using an air plasma, oil contained in the industrial waste object may be ignited. In addition, the ambient atmosphere is degraded by production of smoke, and there are also limits on the processing capacity of the operator.

SUMMARY OF THE INVENTION

The present invention has been developed to overcome the above-described disadvantages.

It is accordingly an objective of the present invention to provide an improved method of, and an improved apparatus for, demolishing an oil-containing industrial waste object efficiently and safely, in which demolition is carried out in an atmosphere in which the oil will not catch fire so that the environment will not be contaminated.

In accomplishing the above and other objectives, the present invention provides a method of demolishing an oil-containing industrial waste object, which comprises the steps of placing an oil-containing industrial waste object within an atmosphere full of an inert gas, and rotating the industrial waste object and irradiating the industrial waste object with a plasma from a plasma arc torch, to thereby cut the industrial waste object horizontally.

The method referred to above may be cyclically repeated while one of the industrial waste object and the plasma arc torch is moved stepwise relative to the other of the industrial waste object and the plasma arc torch. In this case, the industrial waste object is cut horizontally or vertically into slices.

Preferably, the plasma is selected from the group consisting of a nitrogen plasma and an air plasma.

The present invention also provides an apparatus for demolishing an oil-containing industrial waste object, which includes a turntable for supporting thereon of an oil-containing industrial waste object, a sealed enclosure mounted above the turntable for gas-tightly enclosing the industrial waste object, a fluid pumping means for sucking a fluid medium out from the sealed enclosure, and a plasma arc torch fitted inside the sealed enclosure for radiating the industrial waste object with a plasma. After the fluid medium within the sealed enclosure has been sucked out by the fluid pumping means, an inert gas is supplied into the sealed enclosure through an inert gas supply port. The industrial waste object is then irradiated by a plasma from the plasma arc torch while being rotated together with the turntable, to thereby cut the industrial waste object horizontally.

In any event, according to the present invention, since the oil-containing industrial waste object is cut by the plasma arc torch while placed under the atmosphere rich of the inert gas, there is no possibility that the oil contained in the industrial waste object may be ignited. Therefore, the industrial waste object can be demolished safely.

Moreover, since the apparatus has a capability of allowing the industrial waste object to be repeatedly cut, the industrial waste object can be cut efficiently and in a short time into a number of slices each having a desired size.

BRIEF DESCRIPTION OF THE DRAWINGS

The above and other objectives and features of the present invention will become more apparent from the following description of a preferred embodiment thereof made with reference to the sole accompanying drawing i.e.

DETAILED DESCRIPTION OF THE PREFERRED EMBODIMENT

Figure 1:
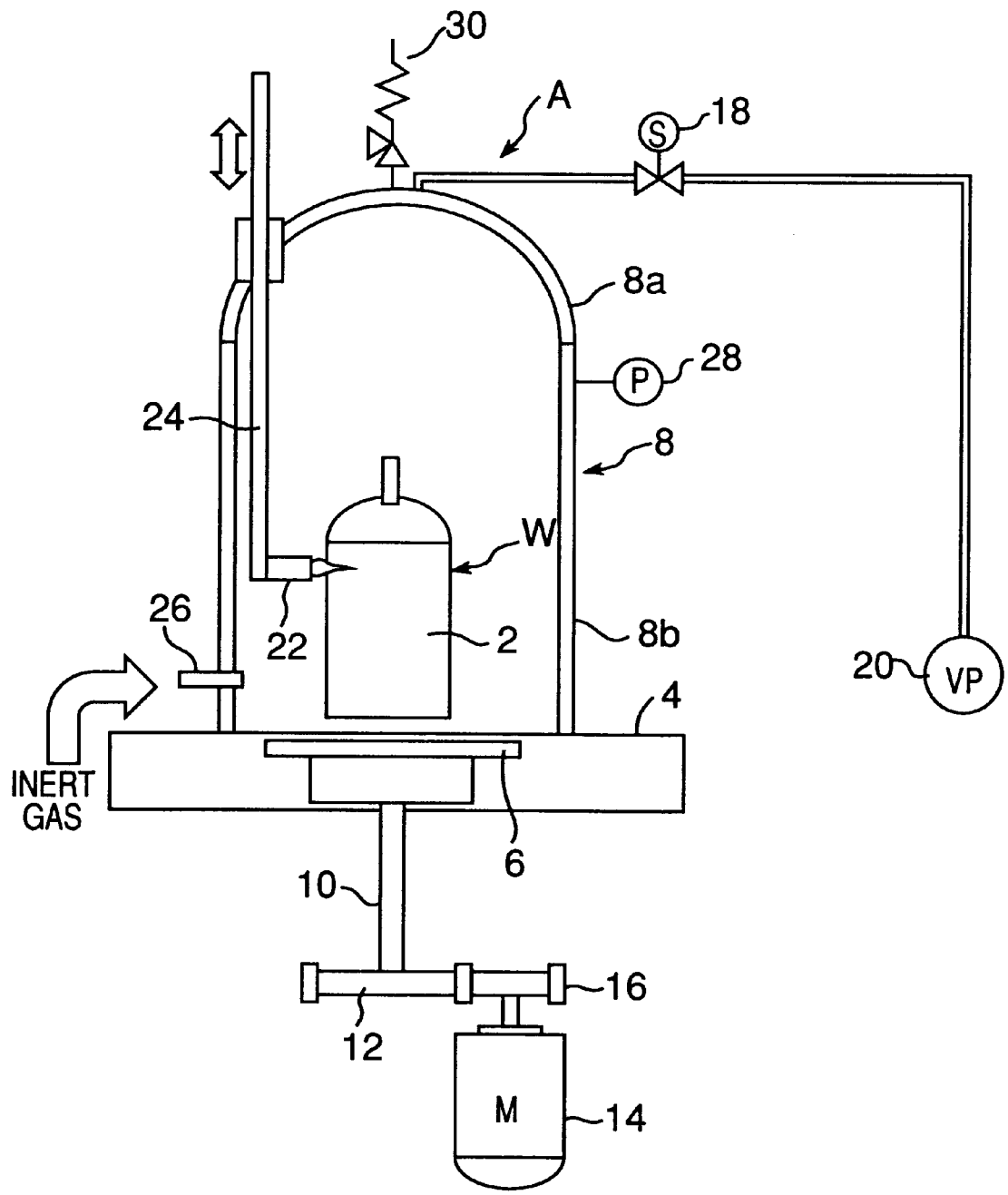
FIG. 1, which illustrates a schematic side sectional view of a demolishing apparatus embodying the present invention.

This application is based on an application No. 10-277563 filed Sep. 30, 1998 in Japan, the content of which is incorporated hereinto by reference.

In the following description, the present invention will be described as used in demolishing a sealed compressor W. As is well known to those skilled in the art, the sealed compressor W includes a substantially hermetically sealed housing 2 accommodating therein an electric motor and various compressor component parts together with a quantity of lubricant oil for lubricating the compressor component parts during operation of the compressor. The lubricant oil in the sealed compressor W is hazardous in that it can be ignited, with the compressor W itself consequently exploding, when the compressor W is demolished by means of, for example, cutting under an oxygen-rich atmosphere.

Referring now to the sole accompanying drawing, a demolishing apparatus embodying the present invention is generally identified by A. This apparatus A includes a support base 4, a turntable 6 rotatably mounted on a center area of the support base 4, and a transparent sealed enclosure 8 made preferably of plastics and mounted sealingly on the support base 4 so as to cover the turntable 6. For loading or unloading the industrial waste object into or out of the interior of the sealed enclosure 8, the sealed enclosure 8 may be separable relative to the support base 4 or may have a door although neither is shown. The turntable 6 is drivingly coupled with a rotary drive source 14 such as, for example, an electric drive motor through a reduction gear unit including a large-diameter gear 12 rotatable together with the turntable 6 and a small-diameter gear 16 meshed with the large-diameter gear 12 and rigidly connected to a drive shaft of the rotary drive source 14.

The interior of the sealed enclosure 8 is fluid-connected with a vacuum pump 20 through an electromagnetic valve 18 and accommodates therein a plasma arc torch 22. The plasma arc torch 22 is fixedly carried by a lower end of a vertically movable fluid supply tube 24 that extends in a airtight manner out of the sealed enclosure 8 through a dome-shaped top wall 8a of the sealed enclosure 8 and through which a fluid medium such as a nitrogen gas is supplied to the plasma arc torch 22. In addition to the dome-shaped top wall 8a, the sealed enclosure 8 includes a generally cylindrical side wall 8b across which an inert gas supply tube 26 extends in a airtight manner so as to supply an inert gas such as a nitrogen gas into the interior of the sealed enclosure 8.

The demolishing apparatus A also includes a pressure gauge 28 mounted externally on the side wall 8b for detecting the pressure inside the sealed enclosure 8, and a safety relief valve 30 mounted on the top wall 8a for protecting the sealed enclosure 8 in the event of the interior pressure exceeding a predetermined value.

Although not shown, the rotary drive source 14, the electromagnetic valve 18, the vacuum pump 20, and various electromagnetic valves disposed on the supply tubes 24 and 26 are electrically connected with a controller so that they can be sequentially controlled by the controller on a time sharing basis.

The demolishing apparatus of the structure described above is operated in the following manner.

A work to be demolished, that is, the compressor W is first loaded into the seated enclosure 8 through an access opening (not shown) which may be defined by the door or by separating the enclosure 8 from the support base 4, so as to be seated on the turntable 6. After the access opening is subsequently closed, the electromagnetic valve 18 is opened and the vacuum pump 20 is driven to evacuate the interior of the sealed enclosure 8 to a predetermined negative pressure. Thereafter, the inert gas is supplied into the sealed enclosure 8 through the inert gas supply tube 26 to such a density that nothing can be ignited or fired within the sealed enclosure 8.

After the supply of the inert gas into the sealed enclosure 8, the rotary drive source 14 is activated to rotate the turntable 6 through the reduction gear unit including the mutually meshed gears 12 and 16 to allow the compressor W to rotate together with the turntable 6. The plasma arc torch 22 is then moved to a predetermined height above the support base 4, and the plasma arc torch 22 is subsequently energized electrically while the fluid medium such as the nitrogen gas is supplied thereto through the fluid supply tube 24. As a result, the plasma arc torch 22 produces a plasma arc with which a portion of the compressor irradiated by the plasma arc starts melting. Accordingly, as the compressor W is turned together with the rotation of the turntable 6, the compressor W can be cut by the plasma arc horizontally at a level spaced a predetermined distance above the support base 4.

By repeating the above described procedure each time the fluid supply tube 24 is lifted or lowered a predetermined distance stepwise, it will readily be seen that the compressor W can be cut into a plurality of round slices, the number of which corresponds to the number of steps the plasma arc torch 22 is lifted or lowered repeatedly.

On the other hand, the lubricant oil remaining in the bottom of the compressor W has a viscosity lowered under the influence of heat generated by the plasma arc and can therefore, be recovered easily.

Although the present invention has been described in connection with the preferred embodiments thereof with reference to the accompanying drawings, it is to be noted that various changes and modifications are apparent to those skilled in the art. By way of example, although the reduction gear unit has been described as including the gears 12 and 16, it may include a belt drive system including pulleys of different diameters and an endless belt trained therebetween. Also, instead of the plasma arc torch being movable up and down, the work to be demolished may be moved up and down relative to the plasma arc torch together with the turntable 6.

In addition, it is possible to cut the work vertically into slices if either the turntable 6 or the plasma arc torch 22 is supported for movement up and down. In such case, if the work is cut also horizontally, the work can be cut into relatively small pieces as compared with the case in which it is cut only horizontally.

In addition, in place of the nitrogen plasma, an air plasma can be equally employed. In any event, the work to be demolished may not be always limited to compressor, but may any of oil-containing industrial waste objects including automotive engines.

Accordingly, such changes and modifications are to be understood as included within the scope of the present invention as defined by the appended claims, unless they depart therefrom.

What is claimed is:

1. An apparatus for demolishing an oil-containing compressor, said apparatus comprising:
   a turntable for supporting thereon an oil-containing compressor;
   a sealed enclosure mounted above the turntable for gas-tightly enclosing the compressor, said enclosure having an inert gas supply port;
   a fluid pumping device for sucking a fluid medium out from the sealed enclosure; and
   a plasma arc torch fitted inside the sealed enclosure for radiating the oil-containing compressor with a plasma; and
   a vertically movable fluid supply tube extending through the sealed enclosure and being connected to the plasma arc torch,
   wherein after the fluid medium within the sealed enclosure has been sucked out by the fluid pumping means, an inert gas is supplied into the sealed enclosure through the inert gas supply port, and the oil-containing compressor is irradiated by a plasma from the plasma arc torch while being rotated together with the turntable, to thereby cut the oil-containing compressor horizontally.

2. The apparatus according to claim 1, wherein the plasma is selected from the group consisting of a nitrogen plasma and an air plasma.

3. The apparatus according to claim 1, wherein said turntable is rotatable about a vertical axis.

4. A method of demolishing an oil-containing compressor, the method comprising:
   placing an oil-containing compressor on a rotatable turntable which is disposed in a sealed enclosure;
   evacuating an interior of the sealed enclosure until a predetermined negative pressure is reached;
   supplying an inert gas into the sealed enclosure until a density of the inert gas is such that nothing can be ignited or fired within the sealed enclosure;
   rotating the turntable so as to rotate the compressor about a vertical axis;

moving a plasma arc torch to a predetermined height above a support base of the sealed enclosure;

irradiating the oil-containing compressor with a plasma from the plasma arc torch, to thereby cut the oil-containing compressor along a horizontally plane; and moving the plasma arc torch to a second predetermined height above the support base and repeating the rotating and irradiating operations to cause the oil-containing compressor to be cut into slices.

5. The method according to claim 4, wherein the plasma is selected from the group consisting of a nitrogen plasma and an air plasma.

* * * * *